US010705883B2

(12) United States Patent
Wen et al.

(10) Patent No.: US 10,705,883 B2
(45) Date of Patent: Jul. 7, 2020

(54) DYNAMIC HYBRID COMPUTING ENVIRONMENT

(71) Applicant: Microsoft Technology Licensing, LLC, Redmond, WA (US)

(72) Inventors: Tong Wen, Needham, MA (US); Sudarshan Raghunathan, Bellevue, WA (US); Ilya Matiach, Quincy, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 115 days.

(21) Appl. No.: 16/012,307

(22) Filed: Jun. 19, 2018

(65) Prior Publication Data
US 2019/0384649 A1  Dec. 19, 2019

(51) Int. Cl.
| G06F 9/46 | (2006.01) |
|---|---|
| G06F 9/50 | (2006.01) |
| G06F 16/182 | (2019.01) |
| G06F 9/445 | (2018.01) |
| G06F 9/455 | (2018.01) |
| G06N 3/02 | (2006.01) |

(52) U.S. Cl.
CPC ............ G06F 9/5088 (2013.01); G06F 9/445 (2013.01); G06F 9/45558 (2013.01); G06F 9/5072 (2013.01); G06F 9/5077 (2013.01); G06F 16/182 (2019.01); G06N 3/02 (2013.01); G06F 2009/45583 (2013.01)

(58) Field of Classification Search
CPC ...... G06F 9/5088; G06F 16/182; G06F 9/445; G06F 9/5072
See application file for complete search history.

(56) References Cited

U.S. PATENT DOCUMENTS

| 2006/0010449 A1 | 1/2006 | Flower et al. |
| 2012/0331144 A1 | 12/2012 | Supalov |
| 2013/0204917 A1 | 8/2013 | Wang et al. |

(Continued)

FOREIGN PATENT DOCUMENTS

WO  2016176011 A1  11/2016

OTHER PUBLICATIONS

"International Search Report and Written Opinion Issued in PCT Application No. PCT/US2019/38016", dated Sep. 30, 2019, 30 Pages.

(Continued)

Primary Examiner — Camquy Truong
(74) Attorney, Agent, or Firm — Schwegman Lundberg & Woessner, P.A.

(57) ABSTRACT

Various embodiments herein each include at least one of systems, methods, and software for instantiating, executing, and operating dynamic hybrid computing environments, such as in cloud computing. Some such embodiments include allocating computing resources of a first server cluster to instantiate a first cluster and to establish a computing session. This embodiment may then initiate execution of a program within the first cluster that offloads at least one computing task to a second cluster, when the second cluster is instantiated, to leverage high-computing speed performance capabilities of the second cluster with regard to certain computing operations. Upon completion of program execution, the second cluster is then deallocated.

20 Claims, 6 Drawing Sheets

(56) References Cited

U.S. PATENT DOCUMENTS

| | | |
|---|---|---|
| 2015/0309829 A1 | 10/2015 | Hiltgen et al. |
| 2017/0026441 A1 | 1/2017 | Moudy et al. |
| 2017/0220949 A1 | 8/2017 | Feng et al. |
| 2017/0293980 A1 | 10/2017 | Phillips et al. |
| 2018/0048532 A1* | 2/2018 | Poort ..................... H04L 67/10 |

OTHER PUBLICATIONS

Porambage, et al., "Survey on Multi-Access Edge Computing for Internet of Things Realization", In Proceedings of IEEE Communications Surveys & Tutorials, vol. 20, Issue 4, Jun. 21, 2018, pp. 2961-2991.

\* cited by examiner

RESOURCE ALLOCATION

◯ CREATE NEW       ◯ MODIFY EXISTING

RESOURCE GROUP: [______]

SSH USER NAME: [______]
SSH PASSWORD: [______]

HEAD NODE SIZE: [______]
WORKER NODE COUNT: [______]
WORKER NODE SIZE: [______]

GPU VM NAME: [______]
GPU VM SIZE: [______]

DYNAMIC HYBRID COMPUTING ENVIRONMENT

BACKGROUND INFORMATION

The booming of deep learning is fueled by both large data sets and large neural networks. Training a Deep Neural Network (DNN) with a large dataset is extremely computation intensive. Training requires machines with special hardware configurations such as accelerators and highspeed networking technologies with low latency and high throughput to achieve realistic training time. For a typical data science workflow, the data preparation and featurization stages and the later model evaluation stage can be run on less expensive commodity hardware such as an Apache Spark cluster at scale in the MapReduce distributed computing pattern. At the same time, some other more computationally intensive workloads, such as DNN training, may call for tightly coupled parallel implementation built upon the Message Passing Interface (MPI) framework and including accelerators to enable high performance parallelism. However, the machines with accelerators, such as Graphics Processing Units (GPUs), are generally expensive, non-commodity machines but these machines may only be partially utilized, remaining dormant when their special-purpose computing resources are not being utilized. This results in expensive, non-commodity computing resources being underutilized.

SUMMARY

Various embodiments herein each include at least one of systems, methods, and software for instantiating, executing, and operating dynamic hybrid computing environments, such as in cloud computing.

One embodiment, in the form of a method, includes receiving allocation input identifying virtual computing resources to be attached to a computing session. The computing resources in some embodiments include a first cluster of at least one virtual machine that operates on a first hardware-type and a second cluster of at least one virtual machine that executes on a second hardware-type. The method also includes receiving secure connectivity input to enable virtual machines of both the first and second clusters to communicate data. Subsequently to receiving the allocation and secure connectivity inputs, the method may then allocate computing resources within a virtual computing environment to establish a computing session according to the allocation input and establishing secure connectivity between the allocated computing resources according to the secure connectivity input. Execution of a program may then be initiated within the first cluster that offloads at least one computing task to the second cluster to leverage a performance enhancing capability of the second hardware-type. The computing task offloaded to the second cluster including the first cluster copying of data from the first cluster to a distributed file system to allow virtual machines of the second cluster to create, read, update, and delete data therein such that data in the distributed file system is immediately available to virtual machines of both the first and second clusters.

Another embodiment, in the form of a system, includes a first server computer cluster upon which a plurality of virtual machines can be instantiated for form a first cluster. This system also includes a second server computer cluster upon which a plurality of virtual machines can be instantiated to form a second cluster. Each server computer of the second computer cluster includes at least one hardware element having high-computing speed performance capabilities with regard to certain computing operations as compared to the same certain computing operations when performed by the servers of the first server cluster. The system of this embodiment also includes a virtual network infrastructure interconnecting the first and second server clusters to provide a virtual computing environment. The virtual network infrastructure also includes a portal through which human and logical users interface with resources of and processes that execute within the virtual computing environment. The portal includes instructions stored within a memory of one of the server computers of the first server cluster that are executable on a processor thereof to perform data processing activities. These data processing activities of the portal include allocating computing resources of the first server cluster to instantiate the first cluster and to establish a computing session. The data processing activities of the portal also include initiating execution of a program within the first cluster that offloads at least one computing task to the second cluster, when the second cluster is instantiated, to leverage the high-computing speed performance capabilities of the second cluster with regard to the certain computing operations. The instantiation of the second cluster may occur, in some embodiments, immediately before the computing task is offloaded thereto. The computing task offloaded to the second cluster including the first cluster copying of data from the first cluster to a distributed file system to allow virtual machines of the second cluster to create, read, update, and delete data therein such that data in the distributed file system is immediately available to virtual machines of both the first and second clusters. Upon completion of program execution, the data processing activities of some embodiments may then deallocate at least the second cluster.

DETAILED DESCRIPTION

As mentioned above, the booming of deep learning is fueled by both large data sets and large neural networks. Training a DNN with a large dataset is extremely computation intensive. Training requires machines with special hardware configurations such as accelerators and high-speed networking technologies, such as InfiniB and and remote direct memory Access (RDMA), to achieve realistic training time. For a typical data science workflow, most operations can be efficiently executed on less expensive commodity hardware such as an Apache Spark cluster at scale in the MapReduce distributed computing pattern. At the same time, some other more computationally intensive workloads, such as DNN training, may call for tightly coupled parallel implementation built upon the MPI framework and including accelerators to enable high performance parallelism. However, machines with accelerators, such as Graphics Processing Units (GPUs), are generally expensive machines that are commonly only partially utilized, remaining dormant when their special-purpose computing resources are not being utilized. The result is inefficiency from expensive resources being underutilized.

The various embodiments herein address the issues of, and embrace the opportunities presented by, underutilization of expensive, non-commodity computing resources. In doing so, the embodiments herein include systems and methods that can perform both non-complex and complex workloads, such as MapReduce and analytic workloads requiring High Performance Computing (HPC), efficiently. At the same time, these embodiments also provide for dynamic reconfiguration with heterogenous hardware at experimentation time allowing dynamic adjustment for specific computation needs, such as for deep learning with GPUs, through connection to HPC resources only when needed. The various embodiments herein hide the integration and management complexities from users and provide ease of use and cost effectiveness where customized and expensive hardware is consumed only when needed. As a result, expensive HPC hardware-enabled virtual machines can be allocated and released dynamically such that they are occupied by cloud tenants only when needed and otherwise shared across the virtual computing infrastructure allowing use by other cloud tenants. Some such embodiments may include caching a state of an HPC resource while it is not being utilized such that the HPC resource may be released and reallocated and its state restored when the HPC resource is once again needed. Such embodiments enable higher utilization of expensive, HPC resources providing cloud operators opportunities to decrease overhead expense, increase profitability, and to share some or all of the cost savings with cloud tenants that pay for cloud usage.

These and other embodiments are described herein with reference to the figures.

In the following detailed description, reference is made to the accompanying drawings that form a part hereof, and in which is shown by way of illustration specific embodiments in which the inventive subject matter may be practiced. These embodiments are described in sufficient detail to enable those skilled in the art to practice them, and it is to be understood that other embodiments may be utilized and that structural, logical, and electrical changes may be made without departing from the scope of the inventive subject matter. Such embodiments of the inventive subject matter may be referred to, individually and/or collectively, herein by the term "invention" merely for convenience and without intending to voluntarily limit the scope of this application to any single invention or inventive concept if more than one is in fact disclosed.

The following description is, therefore, not to be taken in a limited sense, and the scope of the inventive subject matter is defined by the appended claims.

The functions or algorithms described herein are implemented in hardware, software or a combination of software and hardware in one embodiment. The software comprises computer executable instructions stored on computer readable media such as memory or other type of storage devices. Further, described functions may correspond to modules, which may be software, hardware, firmware, or any combination thereof. Multiple functions are performed in one or more modules as desired, and the embodiments described are merely examples. The software is executed on a digital signal processor, ASIC, microprocessor, or other type of processor operating on a system, such as a personal computer, server, a router, or other device capable of processing data including network interconnection devices.

Some embodiments implement the functions in two or more specific interconnected hardware modules or devices with related control and data signals communicated between and through the modules, or as portions of an application-specific integrated circuit. Thus, the exemplary process flow is applicable to software, firmware, and hardware implementations.

Figure 1:
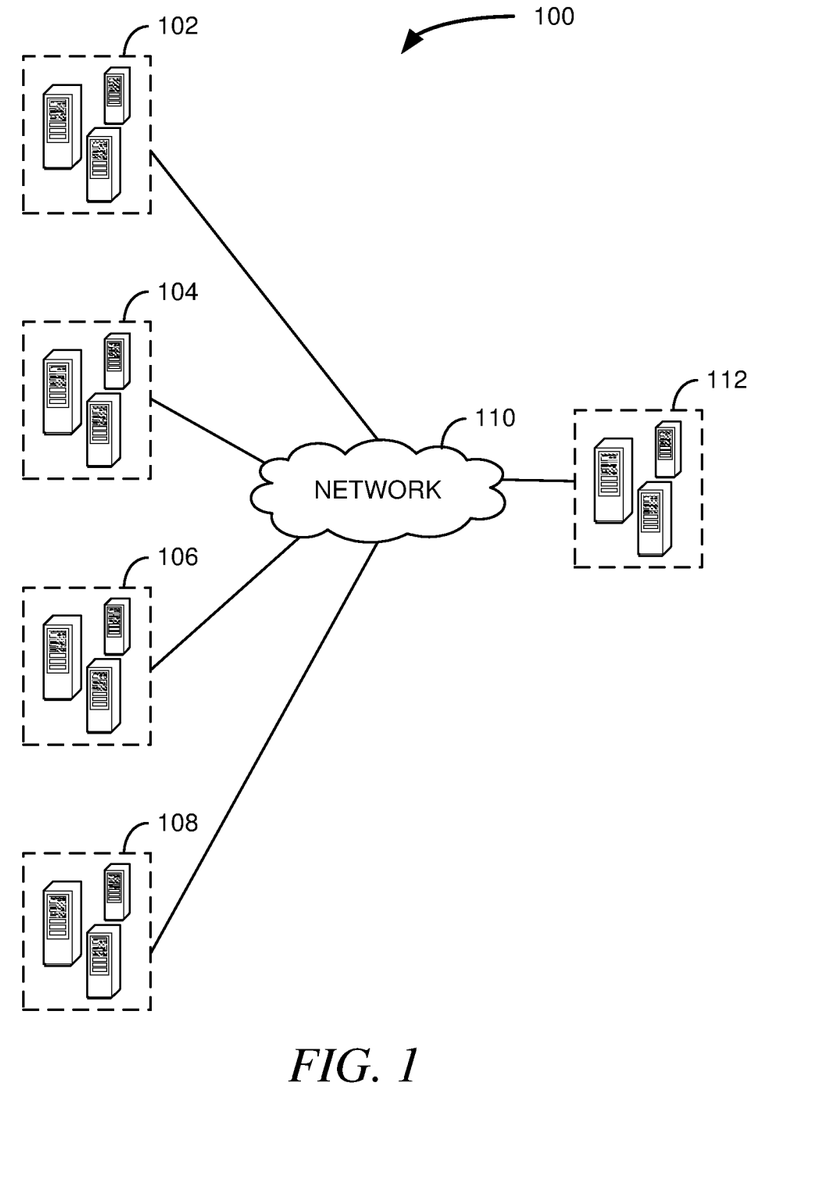
FIG. 1 is a logical block diagram of a system, according to an example embodiment.

FIG. 1 is a logical block diagram of a system 100, according to an example embodiment. The system 100 is an example of computing hardware of a virtual computing environment. The system 100, as illustrated, includes four clusters 102, 104, 106, 108 of inexpensive, commodity hardware servers 102, 104, 106, 108. These clusters 102, 104, 106, 108 are formed of server computers on which Apache Spark, or other such system, may execute. These servers of the clusters 102, 104, 106, 108 are connected to a physical network 110, such as a system area network, local area network, wide area network, the Internet, or other network. Also connected to the network is another of server cluster 112. This cluster 112 includes one or more servers with hardware in addition to commodity hardware of the other cluster 102, 104, 106, 108 servers, such as extended memories of considerable size, Tensor Processing Units (TPUs), Field Programmable Gate Arrays (FPGAs), Graphics Processing Units (GPUs) other than what might be present for graphics processing, and other hardware accelerators and hardware to speed performance of certain operations or data processing tasks. The servers of the cluster 112 are generally servers that support Message Passing Interface (MPI) and may also be referred to herein as MPI cluster 112. When the resources of the cluster 112 include servers with multiple different hardware accelerators and properties, multiple different combinations of these resources may be joined in different arrangements according to configuration parameters to further accelerate performance.

The system 100 supports both big-data processing and high-performance computing at large scale. To do so, the system 100 includes the servers 102, 104, 106, 108 on which Apache Spark is deployed along with the MPI servers 112 running on two disjointed sets of machines. Apache Spark is designed to perform big data processing and analytics workloads expressed in the MapReduce distributed computing pattern. However, for other analytic workloads requiring HPC kernels written in native code and with tightly coupled parallelism, their implementations in Apache Spark can be much slower than those in MPI.

There are prior efforts to run MPI side-by-side on the same Spark cluster, but this approach presents resource contention challenges and the two different types of workloads have different hardware needs for timely execution. For example, Spark is significantly faster than Hadoop in executing iterative workloads by caching the datasets in memory to avoid disk input/output (I/O), whereas MPI requires data fit into the distrusted memory. When a workload is offloaded from Spark to MPI, data is serialized and passed to MPI processes as input. The Spark+MPI implementation uses shared memory for this purpose which means an extra copy of the data in memory. If an MPI application executing on a Spark cluster creates new data structures such as matrices or tensors from the input deserialized into its memory, the MPI application will further increase the pressure on memory demand Machines with larger memory cost more. Workloads such as deep learning also benefit in terms of execution speed from special machine configuration, for example with accelerators like GPUs. Constructing a Spark cluster with such machines is even more expensive and essentially would require each Spark cluster have dedicated MPI resources further compounding the cost issues.

In the system 100, the MPI cluster 112 can have a small number of high performance but expensive machines while the Spark clusters 102, 104, 106, 108 consist of many more but cheaper machines such as those built with commodity hardware. As an example, for a typical deep learning workflow data preparation, featurization, and model evaluation happen on the Spark clusters 102, 104, 106, 108 while model training is offloaded to the MPI cluster 112 of GPU machines and machines within other processors, memory capacities, and other high-performance computing resources for performance acceleration. In this way both systems can perform tasks they are good at on an appropriate set of hardware to deliver both high performance and cost effectiveness in when dealing with both big data and high-compute in the same data processing context. In some such instances, multiple different accelerator types may be joined to a Spark cluster 102, 104, 106, 108, each accelerator-type joined to accelerate data processing tasks the respective accelerator-type is well suited for. At the same time, the system 100 is cloud based and computing resources can be dynamically allocated such that the MPI cluster 112 can be allocated to a Spark cluster 102, 104, 106, 108 only when needed, allowing scaling on demand. This dynamic nature provides cost effectiveness as the computing is driven by processes on the inexpensive Spark clusters 102, 104, 106, 108 and the expensive MPI cluster(s) shared across the Spark 102, 104, 106, 108 clusters. Each Spark cluster 102, 104, 106, 108 therefore does not require its own set of expensive hardware.

Each Spark cluster 102, 104, 106, 108 may include one or more server computers each having one or more virtual machines that execute thereon. Similarly, for the MPI cluster 112, the MPI cluster may be formed of one or more of these tailored computing devices and each may have one or more virtual machines that execute thereon. Note that the clusters may be formed of one or more virtual machines. As such the Spark clusters 102, 104, 106, 108 and the MPI cluster 112, while illustrated as clusters of physical machines may instead be clusters of virtual machines that execute on respective forms of hardware.

Figure 2:
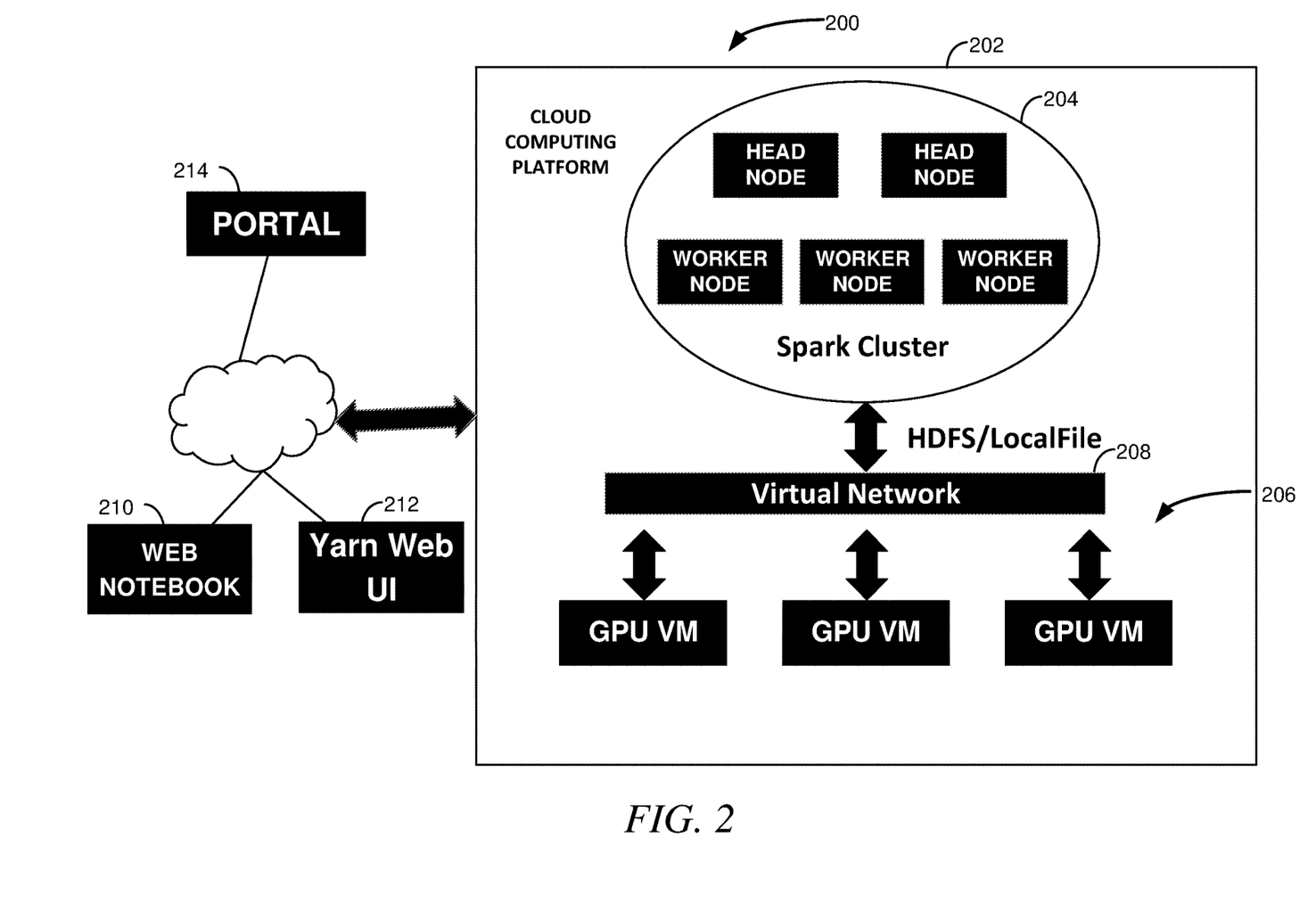
FIG. 2 is a logical block diagram of a virtual computing environment, according to an example embodiment.

FIG. 2 is a logical block diagram of a virtual computing environment 200, according to an example embodiment. The virtual computing environment 200 is a reference implementation such as may be built in part upon a cloud computing platform, such as MICROSOFT® Azure. Included are two clusters of Virtual Machines (VMs) connected via a virtual Network (VNet) 208 such as Azure Virtual Network. Users can access this computing environment 200 in some embodiments via a web browser through a web notebook application 210 hosted on the Spark cluster 204 that provides a collaborative environment, such as Jupyter Notebook, for creation, sharing documents that include elements such as code, equations, visualizations, text, and the like. A run history from applications running on both the Spark cluster 204 and the MPI cluster 206 can be viewed in real time through Yarn Web UI 212. Users can also manage system 202 configuration through a resource manager, such as Azure Resource Manager (ARM), that can be accessed via a virtual computing environment portal 214, such as the Azure Portal. For example, users can dynamically reconfigure the system 202 to address a specific computation need in portal 214 or through a management command line script.

The Spark dataframes of data copied from the Spark Cluster 204 in a serialized manner may be checkpointed into Hadoop File System (HDFS) in the Spark native Parquet format. An MPI application can then read from HDFS on any MPI node in parallel and deserialize the content of a dataframe via a Parquet reader. Note that a serialized dataframe may be stored in a directory of files in HDFS and each file will then correspond to a partition of the dataframe. The partition enables distributed reading where an MPI process can read a portion of the dataframe data. Note however that the sharing of data may vary in different embodiments, such as may be more well suited for particular design goals, regulatory and policy restrictions, and the like. For example, files may be shared in some embodiments for enhanced data security or privacy purposes.

In the embodiment of the virtual computing environment 200, the virtual network 208 is configured to allow Secure Shell (SSH) and Remote Procedure Call (RPC) protocols. SSH protocol is used for integrating the two clusters 204, 206. MPI also uses the SSH protocol in some embodiments to set up connections between the participating nodes. RPC is the protocol utilized in some embodiments to communicate with the Spark cluster's 204 HDFS server.

As can be seen in the Spark cluster 204, each head and worker node also typically includes a machine learning library or other such infrastructure, such as MICROSOFT® Machine Learning (MMLSpark), components built therein. Other embodiments may include other machine learning libraries built in or as may be called thereby. Further, other libraries of functionality may also be built in or otherwise callable depending on the particular intent of an embodiment. Similarly, each node of the MPI cluster 206 also includes elements of a machine learning toolset, such as the MICROSOFT® Cognitive Toolkit (CNTK), built therein. As can be readily seen, the embodiment of FIG. 2 is tailored for machine learning purposes. Note however that other embodiments may be built upon other deep learning frameworks, such as TENSORFLOW™, Caffe/Caffe2 (Convolutional Architecture for Fast Feature Embedding), Py, Torch, PyTorch, and the like. In some embodiments, the deep learning framework may be Onnx (Open Neural Network Exchange) compliant.

Figure 3:
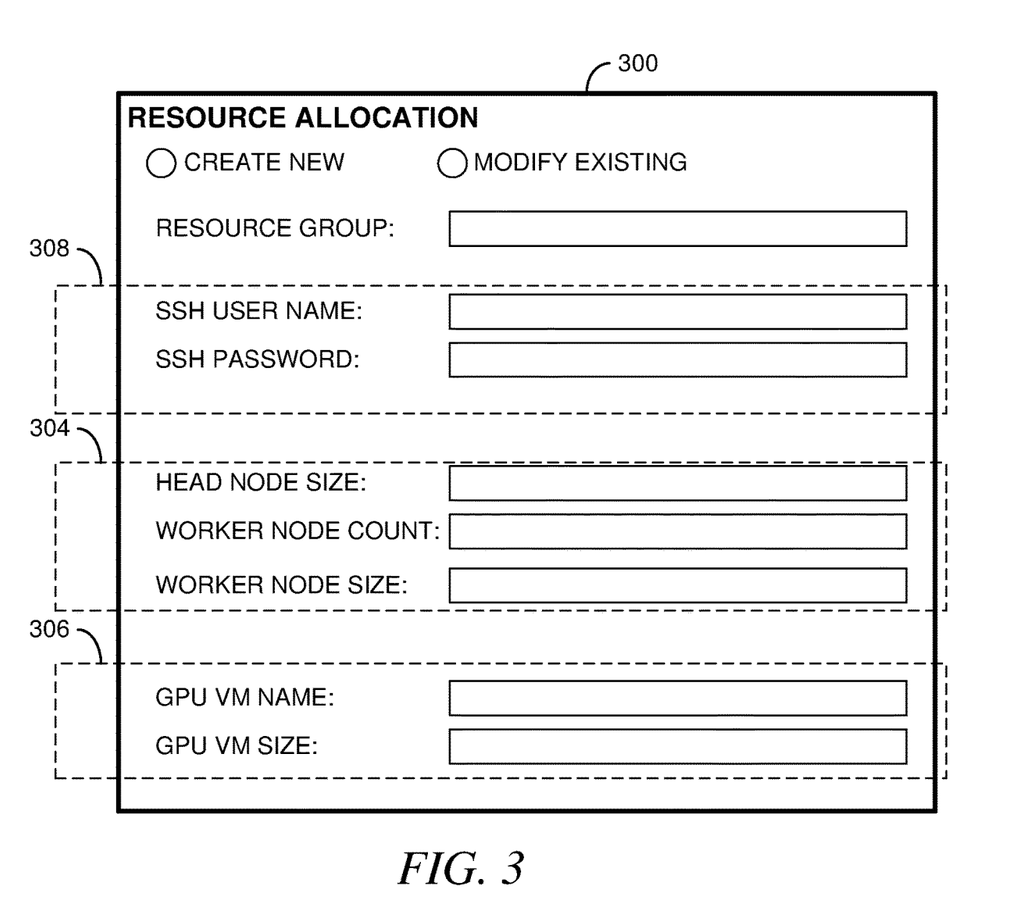
FIG. 3 illustrates an example user interface to receive resource allocation input, according to an example embodiment.

FIG. 3 illustrates an example user interface 300 to receive resource allocation input, according to an example embodiment. The user interface 300 is an example of a user interface that may be accessed via a portal, such as portal 214 of FIG. 2 or other element of the system 200, to allocate resources to form or modify one or both of Spark clusters 204 as head and worker nodes 304 and MPI clusters 206 as accelerators 306. The user interface 300 also includes options to provide parameters 308 to enable SSH or other secure connections between virtual machines of the formed clusters thereby enabling them to share data, such as through HDFS. The parameter names of the user interface 300 are self-explanatory examples and are the same parameters that may be provided in some embodiments programmatically. Programmatically providing such parameters enables programs to adjust the resources they will utilize on the fly. For example, a program, immediately before offloading a resource intensive process to an MPI cluster can allocate the MPI cluster and then release the MPI cluster as soon as processing is complete. This minimizes MPI cluster resource utilization by the Spark cluster the program may be executing upon and enables other programs on the same or other spark cluster to utilize the same MPI cluster more quickly.

In operation the user interface 300 may be viewed in a web browser after following a link thereto from within an app, application, message, or other source. The user interface may be provided by the portal 214 of FIG. 2 as mentioned above, but in other embodiments the user interface may be provided or included in or provided by other software in a similar manner. The user interface 300, in some embodiments, requests parameterized input that completes document, such as a Java Script Object Notation (JSON) template, that underlies the user interface 300. Thus, as input is received within the user interface 300 and is submitted, the template, e.g., JSON template, is completed to form a completed file that is then provided to a virtual computing environment portal, such as the portal 214 of FIG. 2 to instantiate the system. The portal then instantiates and initializes the system to join the desired resources as indicated by the input within the user interface 300 and initializes the computing environment to bring online computing infrastructure resources as specified in user interface input and, in some embodiments, additional resources not visible to the user but specified in the document template underlying the user interface 300. Such infrastructure resources may include a database management system, a distributed file system, computing environment resources that support or otherwise enable certain types of data processing, and the like. When the initialization and instantiation have been completed and the virtual computing environment is ready, a notification may then be provided to the user. This initialization will typically include at least one accelerator.

Subsequently, data processing that utilizes an attached accelerator may be completed, at least for a period, such that the need for the accelerator is not current but may arise again. In such instances, in some such embodiments, the accelerator may be stopped and detached for one or more purposes such as to pause incurring of additional fees by the user for tying up the expensive accelerator resource(s) and allow others to utilize the accelerator resource. In such embodiments, a head node of a Spark cluster may lock access to a particular accelerator virtual machine of interest, capture a current state of the accelerator virtual machine such as by taking and storing a snapshot of data held thereby, executing process, and other state data, and then detaching the accelerator virtual machine. Subsequently when a need for the accelerator returns, the accelerator virtual machine can be reattached by attaching the accelerator virtual machine to the head node of the Spark cluster, restoring the state to the accelerator virtual machine according stored snapshot data, and unlocking the accelerator. The accelerator at this point is again available for data processing.

Figure 4:
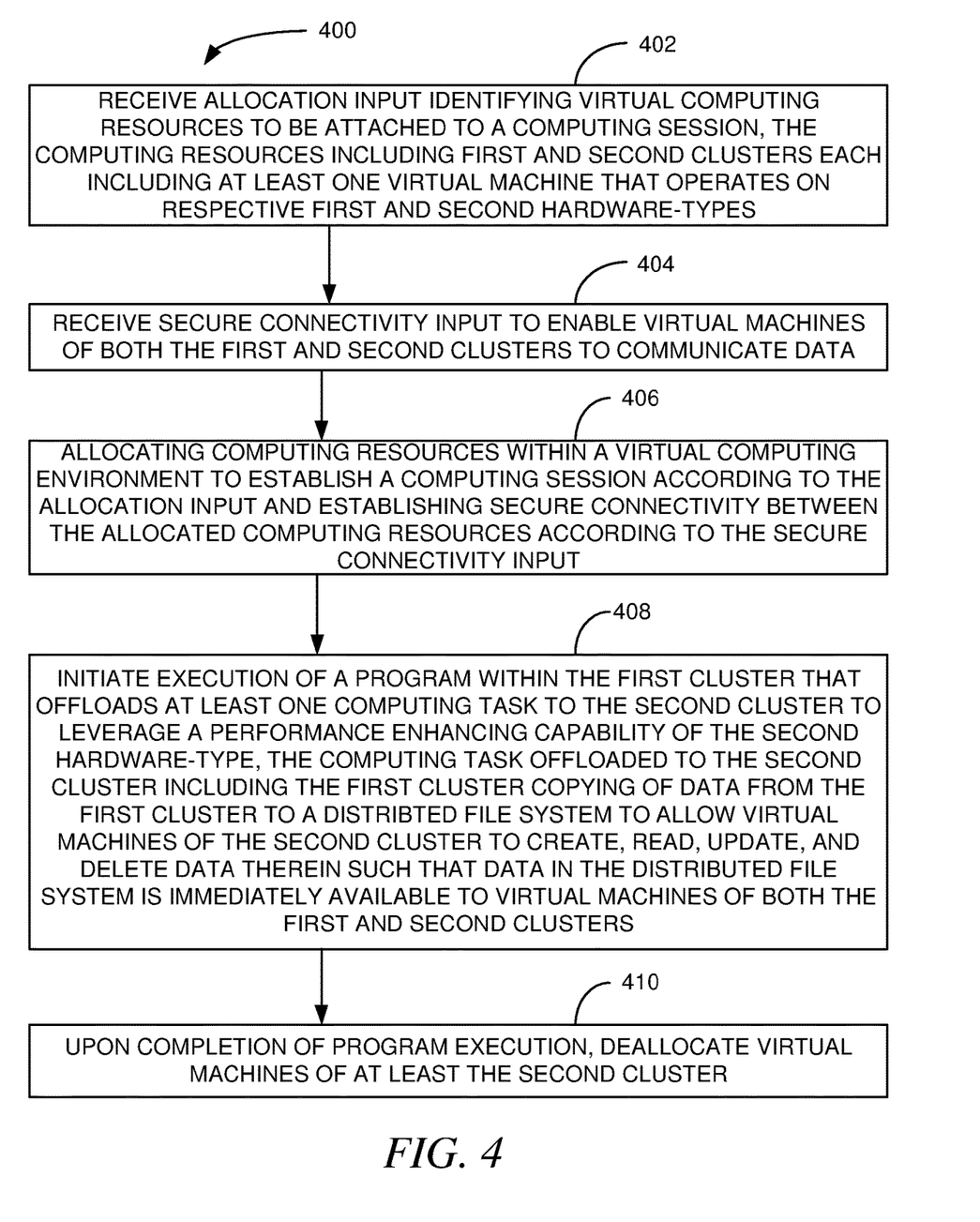
FIG. 4 is a logical block flow diagram of a method, according to an example embodiment.

FIG. 4 is a logical block flow diagram of a method 400, according to an example embodiment. The method 400 is an example of a method that may be performed to allocate and deallocate virtual machine resources.

The method 400 includes receiving 402 allocation input identifying virtual computing resources to be attached to a computing session. The computing resources to be attached typically include a first cluster of at least one virtual machine that operates on a first hardware-type and a second cluster of at least one virtual machine that executes on a second hardware-type. The method 400 also includes receiving 404 secure connectivity input to enable virtual machines of both the first and second clusters to communicate data. Such inputs, in some embodiments, may be received 402, 404 through the example user interface 300 of FIG. 3 or one or more other user interfaces that are tailored to the particular embodiment. Regardless of the particular inputs received 402, 404, the user interface may be accessible to a user via a web browser, a mobile device app, a command line interface, and the like.

Returning to the method 400, after receiving 402, 404 both of the allocation and secure connectivity inputs, the method 400 includes allocating 406 computing resources within a virtual computing environment to establish a computing session according thereto. The method 400 also includes establishing secure connectivity between the allocated computing resources according to the secure connectivity input.

The method 400 may then initiate 408 execution of a program within the first cluster that offloads at least one computing task to the second cluster to leverage a performance enhancing capability of the second hardware-type. In such embodiments, the computing task offloaded to the second cluster including the first cluster copying of data from the first cluster to a distributed file system to allow virtual machines of the second cluster to create, read, update, and delete (CRUD) data therein such that data in the distributed file system is immediately available to virtual machines of both the first and second clusters. Upon completion of program execution, the method 400 may deallocate 410 virtual machines of at least the second cluster.

In some embodiments of the method 400, the first cluster is a Spark cluster and the second cluster is an MPI cluster.

In some embodiments of the method 400, the first hardware-type is low-cost commodity computing hardware and the second hardware-type includes at least one hardware computing resource not present in the first hardware-type, or at least not utilized in the same manner, and having high-computing speed performance capabilities with regard to certain computing operations as compared to the same certain computing operations when performed by the first hardware-type. In some such embodiments, the at least one hardware computing resource of the second hardware-type not present in the first hardware-type includes a hardware accelerator such as a GPU or TPU that increases performance of certain computing operations.

In some further embodiments of the method 400, at least one of the allocation and secure connectivity inputs is received 402, 204 to update a computing session previously established within the virtual computing environment. In some embodiments, the at least one of the allocation and secure connectivity inputs received 402, 404 as an application programming interface (API) or web services call via a network from a program executing within the first cluster. The API or web services call may be services provided by a resource manager, such as Azure Resource Manager, of the virtual computing environment.

Figure 5:
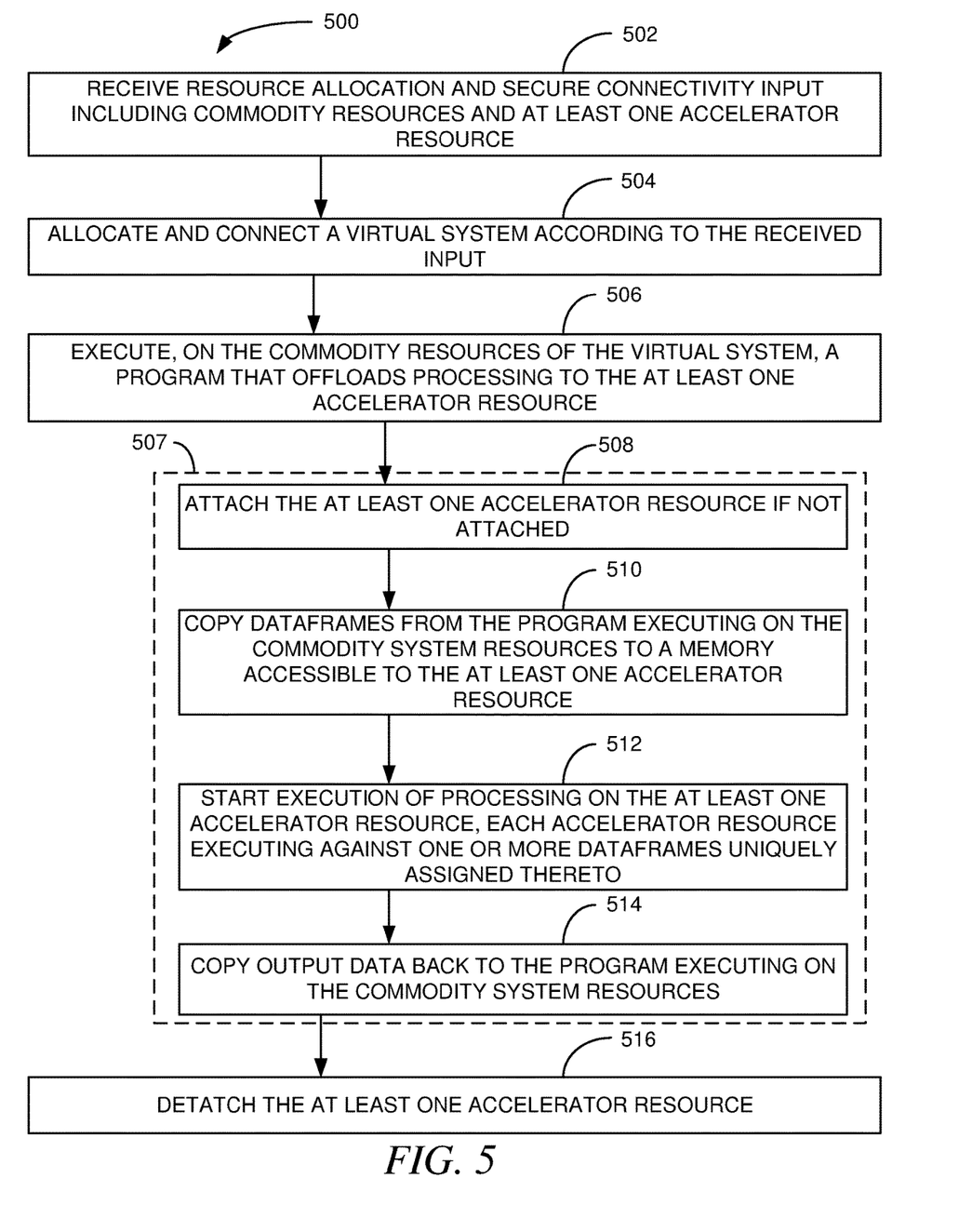
FIG. 5 is a logical block flow diagram of a method, according to an example embodiment.

FIG. 5 is a logical block flow diagram of a method 500, according to an example embodiment. The method 500 is another example of a method that may be performed to allocate and deallocate virtual machine resources. The method 500 is in two portion—the first portion being the method 500 as a whole, but there is an offload process 507 sub-portion that handles offloading of processing to at least one accelerator.

The method 500 includes receiving 502 resource allocation and secure connectivity input including commodity resources and at least one accelerator resource. The method 500 then continues by allocating and connecting 504 a virtual system according to the received input, such as by allocating a head node and one or more worker nodes within the spark cluster 204 of FIG. 2 and at least one GPU VM within the MPI cluster 206, also of FIG. 2. The allocating and connecting 504 also includes bringing infrastructure components of the created virtual machine computing environment online as needed, such as virtual machine software, database and data management software, data communication connectivity, portals and links therebetween, and the like.

The method 500 may then begin executing 506, on the commodity resources of the virtual system, a program that offloads processing to the at least one accelerator resource. The executing 506 may be initiated by an automated process based on program execution input that may also be received with the received 502 resource allocation and secure connectivity input. In other embodiments, the executing may be initiated by a user.

Regardless of how the executing 506 is initiated, at some point the program reaches a point where an accelerator is to be used to perform HPC processing more rapidly than possible on the commodity resources. The offload process 507 sub-portion is then invoked at this point to offload processing from the commodity resources to the at least one accelerator resource. In some such embodiments, when the at least one accelerator to be used is not yet attached or has been suspended, the method 500 includes attaching 508 the at least one accelerator. The attaching may be performed automatically upon the program calling the resource via a commodity resource virtual machine infrastructure call, one or more command line instructions issued by a user or by the program to a cloud computing portal, such as the portal 214 of FIG. 2, or in a similar manner. In the event the accelerator has been previously attached by has been locked, stopped, and detatched as discussed above, a virtual machine of each of the at least one accelerator resources can be reattached. This reattachment may occur in some such embodiments by attaching an accelerator virtual machine of each of the at least one accelerator resources to a head node of the commodity resources, restoring a stored state to each accelerator virtual machine according stored snapshot data, and unlocking each of the at least one accelerators. The at least one accelerator at this point is again available for data processing.

The offload process 507 then continues by copying 510 dataframes from the program executing on the commodity system resources to a memory accessible to the at least one accelerator resource. The copying of the data frames may be copying of Spark dataframes when the commodity resources are resources of a Spark Cluster. In such embodiments, data is copied from a Spark Cluster in a serialized manner and is checkpointed into HDFS in the Spark native Parquet format. An application that executes on an accelerator can then read from HDFS on in parallel and deserialize the content of a dataframe via a Parquet reader. Note that a serialized dataframe may be stored in a directory of files in HDFS and each file will then correspond to a partition of the dataframe. The partition in such embodiments enables distributed reading where a process that executes on an accelerator resource can read a portion of the dataframe data. Note however that the sharing of data may vary in different embodiments, such as may be more well suited for particular design goals, regulatory and policy restrictions, and the like. For example, files may be shared in some embodiments for enhanced data security or privacy purposes.

The offload process 507 of the method 500 may then start 512 execution of processing on the at least one accelerator resource. Each accelerator resource may execute against one or more dataframes uniquely assigned thereto. Eventually the processing offloaded to the at least one accelerator resource will conclude. The offload process 507 may then conclude by copying 514 output data of the offloaded processing back to the program executing on the commodity system resources. This copying may be performed by a process that executes on the at least one accelerator resource, by the program executing 506 on the commodity resources, or a combination thereof.

The offload process 507 has now completed. In some instances, a need for the at least one accelerator resource may be complete. The at least one accelerator resource may then be detatched 516 completely by issuance of a command to the portal. In other embodiments, there is not a current need for the at least one accelerator resource, but a future need may exist. In such instances, the at least one accelerator resource may still be detached 516, but a state of the at least one accelerator resource is first cached to allow restoration of the at least one accelerator resource when the need returns. In some such embodiments, a head node of the commodity resources may lock access to a virtual machine of the at least one accelerator resource, capture a current state of the at least one accelerator resource virtual machine such as by taking and storing a snapshot of data held thereby, executing process, and other state data, and then detaching the at least one accelerator resource virtual machine. The at least one accelerator resource usage has thus been suspended and can be used once again as discussed above with regard to the attaching 508 of the at least one accelerator resource if it is not attached.

Figure 6:
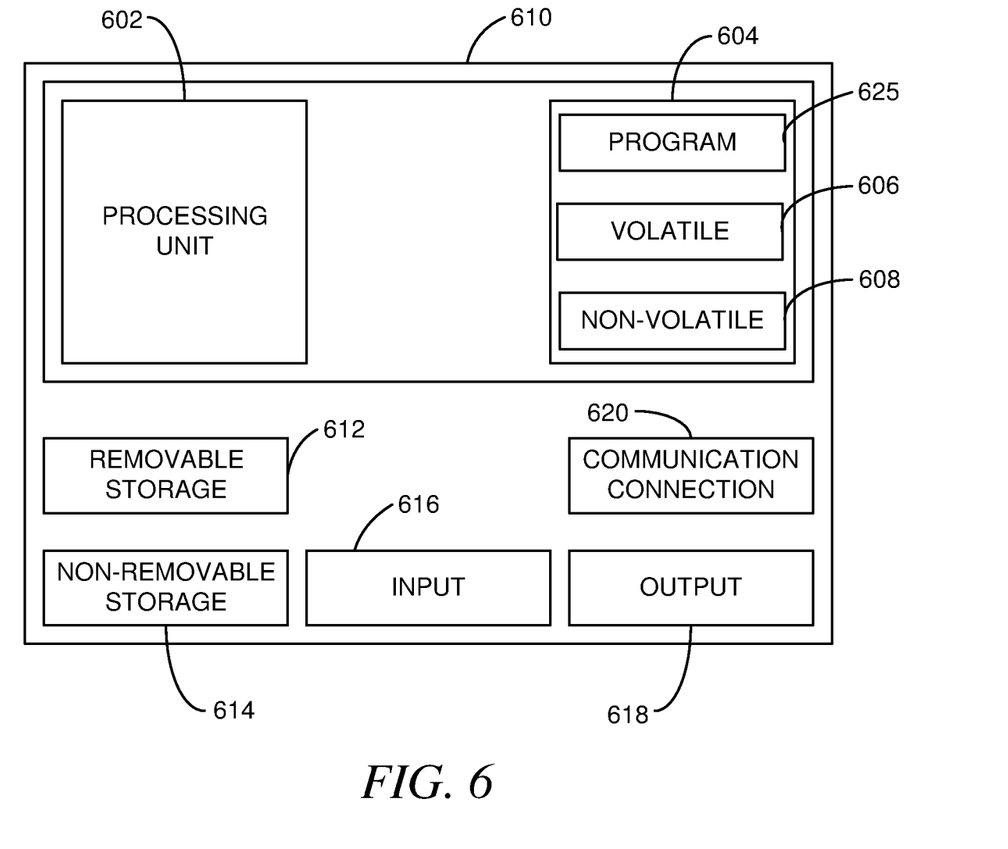
FIG. 6 is a block diagram of a computing device, according to an example embodiment.

FIG. 6 is a block diagram of a computing device, according to an example embodiment. In one embodiment, multiple such computer systems are utilized in a distributed network to implement multiple components in a transaction-based environment. An object-oriented, service-oriented, or other architecture may be used to implement such functions and communicate between the multiple systems and components. The illustrated computing device, in some embodiments, may be a server computer upon which one or more virtual machines may be instantiated.

One example computing device in the form of a computer 610, may include a processing unit 602, memory 604, removable storage 612, and non-removable storage 614. Memory 604 may include volatile memory 606 and non-volatile memory 608. Computer 610 may include—or have access to a computing environment that includes—a variety of computer-readable media, such as volatile memory 606 and non-volatile memory 608, removable storage 612 and non-removable storage 614.

Some embodiments may further include additional processing units 602. The additional processing units may be standard general-purpose computer processors, but may alternatively be one or more of GPUs, tensor processing units (TPUs), gate arrays, applicant specific integrated circuits, or other processing units that may be deployed as accelerators or provide high performance computing capabilities with regard to certain operations or processing tasks.

Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

In some embodiments, one or more forms of memory 604 may be significantly large, such as to enable rapid processing of data that avoids latency from data storage disk input and output.

Computer 610 may include or have access to a computing environment that includes input 616, output 618, and a communication connection 620. The computer may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN) or other networks.

Computer-readable instructions stored on a computer-readable medium are executable by the processing unit 602 of the computer 610. A hard drive, CD-ROM, and RAM are some examples of articles including a non-transitory computer-readable medium. For example, various computer programs 625 or apps, such as one or more applications and modules implementing one or more of the methods illustrated and described herein or an app or application that executes on a mobile device or is accessible via a web browser, may be stored on a non-transitory computer-readable medium. In some other examples, the various computer programs 625 may include virtual machine software that executes to provide one or more virtual machines that may operate as part of a cloud computing infrastructure as described in many of the other embodiments herein.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A method comprising:
receiving allocation input identifying virtual computing resources to be attached to a computing session, the computing resources including a first cluster of at least one virtual machine that operates on a first hardware-type and a second cluster of at least one virtual machine that executes on a second hardware-type;
receiving secure connectivity input to enable virtual machines of both the first and second clusters to communicate data;
allocating the computing resources within a virtual computing environment to establish a computing session according to the allocation input and establishing secure connectivity between the allocated computing resources according to the secure connectivity input;
initiating execution of a program within the first cluster that offloads at least one computing task to the second cluster to leverage a performance enhancing capability of the second hardware-type, the computing task offloaded to the second cluster including the first cluster copying of data from the first cluster to a distributed file system to allow virtual machines of the second cluster to create, read, update, and delete data; and
upon completion of program execution, deallocating virtual machines of at least the second cluster.

2. The method of claim 1, wherein:
the first hardware-type is low-cost commodity computing hardware; and
the second hardware-type includes at least one hardware computing resource not present in the first hardware-type and having high-computing speed performance capabilities with regard to certain computing operations as compared to the same certain computing operations when performed by the first hardware-type.

3. The method of claim 2, wherein the at least one hardware computing resource of the second hardware-type not present in the first hardware-type includes a hardware accelerator.

4. The method of claim 3, wherein the hardware accelerator includes at least one graphics processing unit deployed for utilization to increase performance of certain computing operations.

5. The method of claim 1, wherein data stored and updated in the distributed file system is immediately available to virtual machines of both the first and second clusters.

6. The method of claim 1, wherein the allocation and secure connectivity input are received from a user via at least one browser form submitted via a network.

7. The method of claim 1, wherein at least one of the allocation and secure connectivity inputs is received to update a computing session previously established within the virtual computing environment, the at least one of the allocation and secure connectivity inputs received as an application programming interface (API) or web services call via a network from a program executing within the first cluster.

8. The method of claim 7, wherein the allocation of computing resources of the second cluster is not performed until immediately prior to the offloading of the at least one computing task thereto.

9. The method of claim 1, wherein the program is a machine learning program that begins execution within the first cluster including data preparation and later model evaluation operations following completion of the execution in the second cluster that includes deep neural network (DNN) training to form a model.

10. A system comprising:
a first server computer cluster upon which a plurality of virtual machines can be instantiated for form a first cluster;
a second server computer cluster, each server computer of the second computer cluster including at least one hardware element having high-computing speed performance capabilities with regard to certain computing operations as compared to the same certain computing operations when performed by the servers of the first server cluster, upon which a plurality of virtual machines can be instantiated to form a second cluster; and
a virtual network infrastructure interconnecting the first and second server clusters to provide a virtual computing environment and including a portal through which human and logical users interface with resources of and processes that execute within the virtual computing environment, the portal including instructions stored within a memory of one of the server computers of the first server cluster and executable on a processor thereof to perform data processing activities comprising:
allocating computing resources of the first server cluster to instantiate the first cluster and to establish a computing session;
initiating execution of a program within the first cluster that offloads at least one computing task to the second cluster, when the second cluster is instantiated, to leverage the high-computing speed performance capabilities of the second cluster with regard to the certain computing operations, the computing task offloaded to the second cluster including the first cluster copying of data from the first cluster to a distributed file system to allow virtual machines of the second cluster to create, read, update, and delete data therein such that data in the distributed file system is immediately available to virtual machines of both the first and second clusters; and upon completion of program execution, deallocating at least the second cluster.

11. The system of claim 10, wherein:

the first sever computer cluster is formed of commodity computing hardware of lower cost than computing hardware of the second computer cluster.

12. The system of claim 10, wherein the at least one hardware element of each server computer of the second server computer cluster is a hardware accelerator application specific integrated circuit.

13. The system of claim 12, wherein the at least one hardware element of each server computer of the second server computer cluster further includes a configurable amount of memory.

14. The system of claim 10, wherein data stored and updated in the distributed file system is immediately available to virtual machines of both the first and second clusters.

15. The system of claim 10, wherein the portal allocates the computing resources according to allocation and secure connectivity input the allocation input identifying virtual computing resources of the first and second server computer clusters to be attached to the computing session.

16. The system of claim 15, wherein the allocation of server computers of the second cluster is not performed until immediately prior to the offloading of the at least one computing task thereto.

17. The system of claim 10, wherein the program is a machine learning program that begins execution within the first cluster including data preparation and later model evaluation operations following completion of the execution in the second cluster that includes deep neural network (DNN) training to form a model.

18. A non-transitory computer readable medium with instructions stored thereon that are executable on at least one computing device to perform data processing activities comprising:

receiving allocation input identifying virtual computing resources to be attached to a computing session, the computing resources including a first cluster of at least one virtual machine that operates on a first hardware-type and a second cluster of at least one virtual machine that executes on a second hardware-type;

receiving secure connectivity input to enable virtual machines of both the first and second clusters to communicate data;

allocating computing resources within a virtual computing environment to establish a computing session according to the allocation input and establishing secure connectivity between the allocated computing resources according to the secure connectivity input;

initiating execution of a program within the first cluster that offloads at least one computing task to the second cluster to leverage a performance enhancing capability of the second hardware-type, the computing task offloaded to the second cluster including the first cluster copying of data from the first cluster to a distributed file system to allow virtual machines of the second cluster to create, read, update, and delete data therein such that data in the distributed file system is immediately available to virtual machines of both the first and second clusters; and upon completion of program execution, deallocating virtual machines of at least the second cluster.

19. The non-transitory computer readable medium of claim 18, wherein at least one of the allocation and secure connectivity inputs is received to update a computing session previously established within the virtual computing environment, the at least one of the allocation and secure connectivity inputs received as an application programming interface (API) or web services call via a network from a program executing within the first cluster.

20. The non-transitory computer readable medium of claim 19, wherein the allocation of computing resources of the second cluster is not performed until immediately prior to the offloading of the at least one computing task thereto.

* * * * *

UNITED STATES PATENT AND TRADEMARK OFFICE
CERTIFICATE OF CORRECTION

PATENT NO. : 10,705,883 B2
APPLICATION NO. : 16/012307
DATED : July 7, 2020
INVENTOR(S) : Wen et al.

Page 1 of 1

It is certified that error appears in the above-identified patent and that said Letters Patent is hereby corrected as shown below:

On the Title Page

In item (72), in "Inventors", in Column 1, Line 3, after "(US);" insert --Akshaya Annavajhala, Cambridge, MA (US); Chang Young Park, Somerville, MA (US);--

Signed and Sealed this
Twenty-third Day of March, 2021

Drew Hirshfeld
*Performing the Functions and Duties of the*
*Under Secretary of Commerce for Intellectual Property and*
*Director of the United States Patent and Trademark Office*